United States Patent [19]

Pearson et al.

[11] Patent Number: 4,471,761
[45] Date of Patent: Sep. 18, 1984

[54] LOUVERED AIR-HEATING SOLAR COLLECTOR

[75] Inventors: Joseph T. Pearson; David M. Christopher, both of West Lafayette, Ind.

[73] Assignee: Purdue Research Foundation, West Lafayette, Ind.

[21] Appl. No.: 362,477

[22] Filed: Mar. 26, 1982

[51] Int. Cl.³ .............................................. F24J 3/02
[52] U.S. Cl. .................................... 126/429; 126/449
[58] Field of Search ............... 126/429, 449, 444, 445, 126/446, 450, 417; 165/166, 167, 170

[56] References Cited

U.S. PATENT DOCUMENTS

| 201,439 | 3/1878 | Moreau | 126/449 |
|---|---|---|---|
| 2,680,565 | 6/1954 | Lof | 126/429 |
| 4,016,861 | 4/1977 | Taylor | 126/449 |
| 4,092,978 | 6/1978 | Levine | 126/449 |
| 4,141,338 | 2/1979 | Lof | 126/449 |
| 4,144,871 | 3/1979 | Porter | 126/449 |
| 4,203,428 | 5/1980 | Fodor | 126/450 |
| 4,243,023 | 1/1981 | Rom | 126/429 |
| 4,246,888 | 1/1981 | Jarzenbeck | 126/429 |
| 4,262,657 | 4/1981 | McCullough | 126/449 |
| 4,262,659 | 4/1981 | Brzezinski | 126/449 |
| 4,270,516 | 6/1981 | Hopper | 126/449 |
| 4,289,117 | 9/1981 | Butcher | 126/449 |
| 4,316,449 | 2/1982 | Fodor | 126/449 |

*Primary Examiner*—Daniel J. O'Connor
*Attorney, Agent, or Firm*—O'Rourke & Harris

[57] ABSTRACT

An improved absorber unit is provided for a solar collector, said absorber unit being comprised of a unitary conductive perforated sheet, folded so that segments thereof are disposed adjacent one another and perforated so that air flow is facilitated along both sides of the absorber sheet, thereby greatly increasing convective heat transfer and efficiency of the absorber.

4 Claims, 4 Drawing Figures

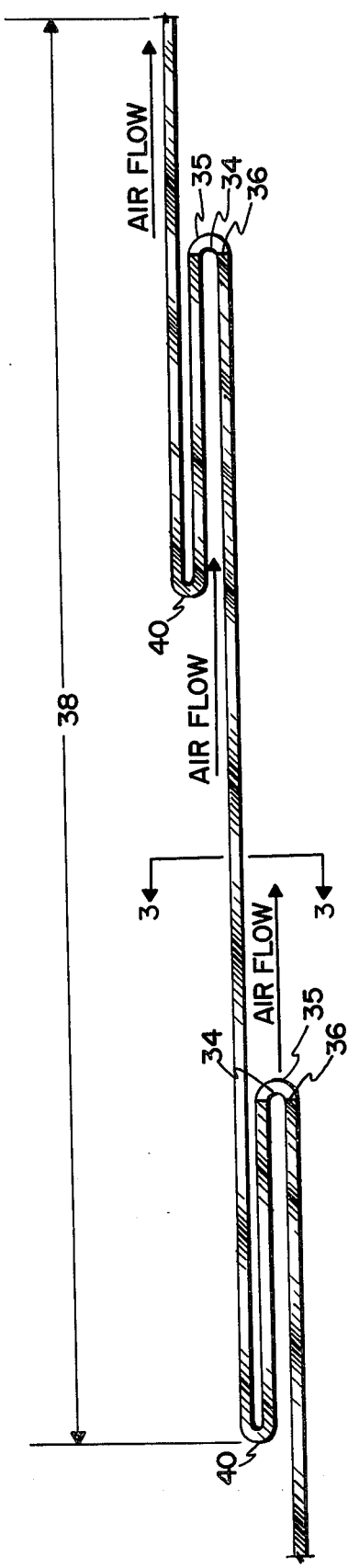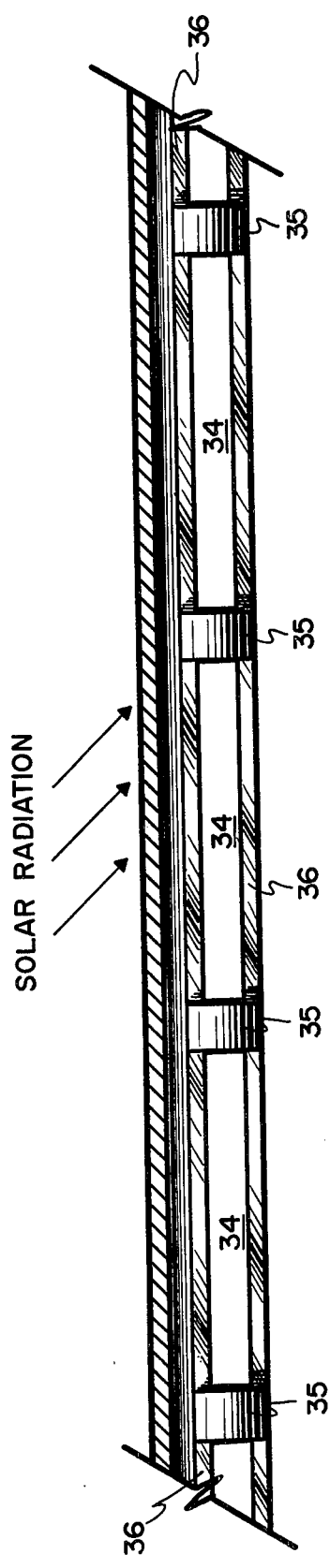

LOUVERED AIR-HEATING SOLAR COLLECTOR

BACKGROUND OF THE INVENTION

Conventional flat plate solar collectors are shown, for example, in U.S. Pat. No. 2,680,437. Some improvements have been made on this type of solar heat trap, but they have primarily consisted of altering the configuration of the absorber (collector plate) surface, as for example in U.S. Pat. No. 4,029,080, in an attempt to increase area and to gain longer efficient exposure to existing solar radiation during a normal day.

As pointed out in U.S. Pat. No. 4,119,083, "in the past solar energy absorbing materials have largely been imperforate metal plates coated with highly absorptive coatings."

Apparently, no one has specifically addressed the issue of both increased effective heat transfer surface of the solar collector plate and the issue of practical and inexpensive manufacture of such plate. A desired object of the present invention is to both maximize heat transfer and to maintain inexpensive manufacturing design requirements.

SUMMARY OF THE INVENTION

The louvered solar collector of the present invention replaces the flat plate air heating collector and variations of flat plate designs. Performance of flat plate solar collectors is limited by poor heat transfer from the absorber surface to the air. Improvements of the flat plate design, such as the corrugated surface, enhance the heat transfer somewhat but with a concurrent increase in cost. Consequently, the economies of the augmented designs are not significantly better than the flat plate solar collector. The louvered solar collector here proposed consists of a louvered absorber surface inside a conventional non-concentrating air heating collector. The solar collector here proposed is a more efficient alternative to current air heating solar collector designs known to applicants. Compared to flat plate collectors, the louvered design has improved heat transfer from the absorber to the air which results both from the high convective heat transfer coefficient inherent in the louver design, and the increased surface area, since air flows on both sides of the louver structure. The simplified design of the louvered surface proposed in the preferred embodiment also has the potential for low cost mass production.

The present invention has greatly increased the effective heat transfer surface of the absorber unit by utilizing perforations between segments of the louvered configuration, which perforations permit air flow along both surfaces of each louver segment. The proposed preferred embodiment also, while attaining the increased heat transfer characteristics, provides a convenient and inexpensive method of manufacture of the continuous louver structure by a predesigned series of apertures that are pressed out of the metallic sheet used to form the absorber plate, and then the absorber plate (louver) is simply formed into the desired configuration and the spacing of the overlapping plate segments may be preprogrammed to obtain the desired temperature gradients and heat flow characteristics that may be required in a given design situation.

This invention was made while working under U.S. Department of Energy Contract No. EM—78—C—0-4—5366.

DETAILED DESCRIPTION OF THE DRAWINGS

FIG. 2 is a sectional view of a portion of the continuous louver of the preferred embodiment of this invention.

FIG. 3 is a sectional view taken along line 3—3 of FIG. 2 showing one segment of the continuous louver.

DETAILED DESCRIPTION OF THE PREFERRED EMBODIMENT INVENTION

Figure 1:
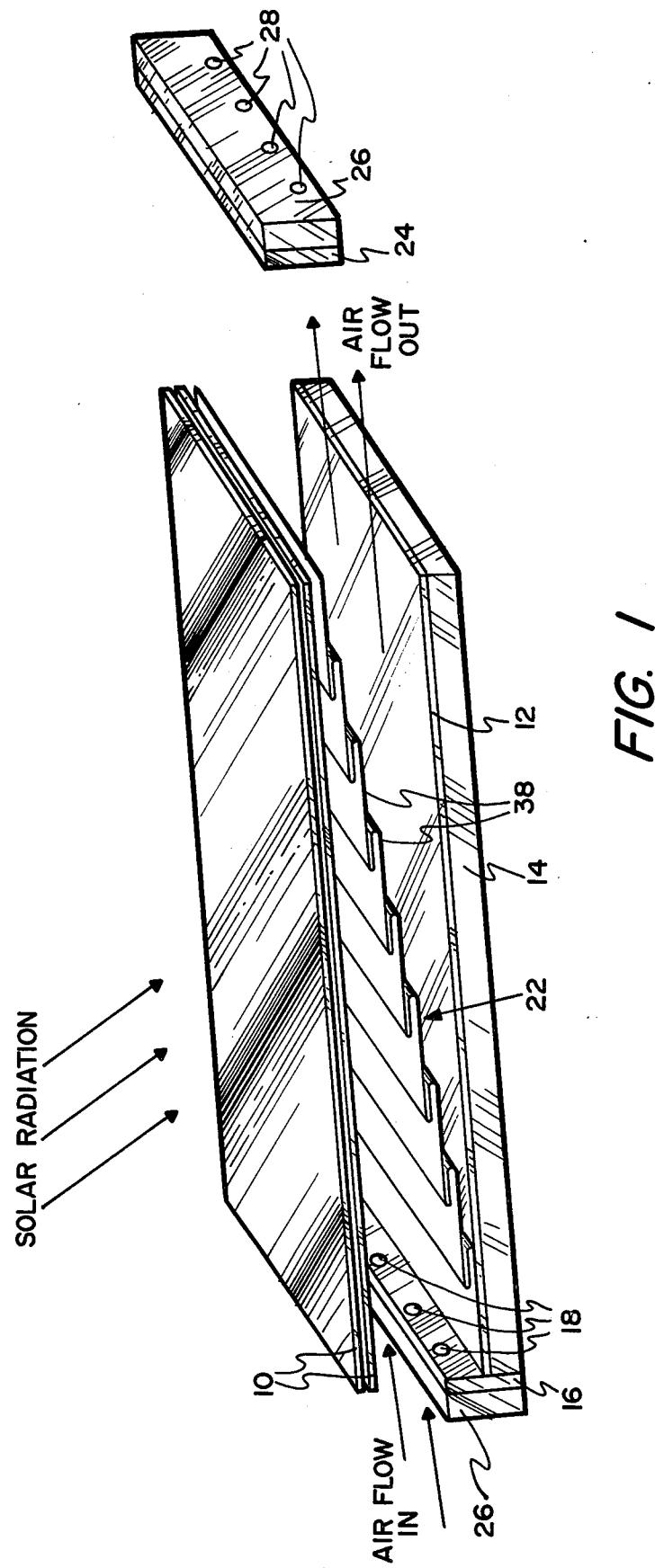
FIG. 1 is an exploded schematic showing of the present invention.

The present invention consists of a louver structure 22 captured between cover plates 10, which are of the standard type used in active and passive solar collectors, and back plate 12 and an exit end plate 24 and an entry end plate 16 and side plates (not shown). The end plates, side plates, and bottom plate, are surrounded by insulative material 26, (side plate insulation not shown) and 14. The entry end plate 16, and surrounding insulation 26, have inlet air holes 18, and the exit end plate 24 and insulation 26 have exit air holes 28.

Figure 4:
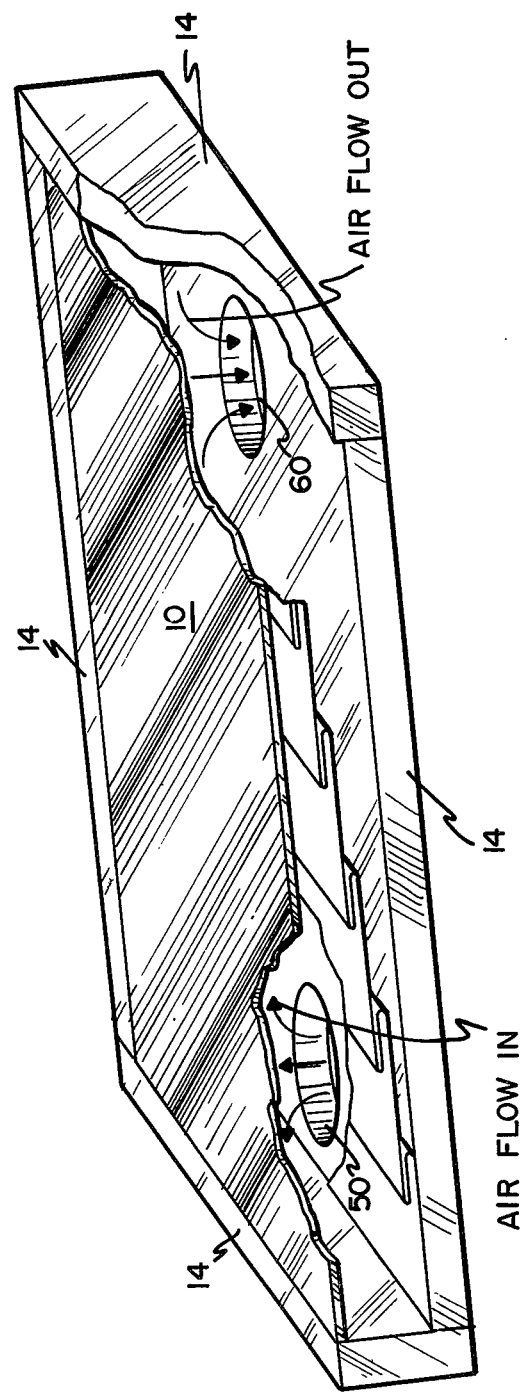
FIG. 4 is a schematic view of another embodiment of this invention.

Air flow into and out of the collector can be accomplished by several methods. Air can flow in and out of the collector ends as shown in FIG. 1. Alternatively air can flow into the collector through a round duct 50 penetrating the insulation and the back plate and the louver structure at the left of the collector as shown in FIG. 4. The duct 50 terminates at the louver structure and is fastened to it in an air tight manner. Heated air is removed from the collector by means of a second round duct 60 penetrating the insulation and back plate at the right of the collector. This duct terminates at the back plate and is fastened to it in an air tight manner.

The point of novelty of the present invention is the folded louver 22, which shall now be described according to a typical segment 38. As shown in FIG. 2, a typical segment 38 connects with another segment 38 and a plurality of apertures or holes (indicated in both FIG. 2 and FIG. 3 at 34) are pre-formed along a line into a bridge portion 35 which forms part of the mid-portion of a segment 38.

The louver 22, schematically indicated in FIG. 1, as to the preferred embodiment, is formed from a single metallic sheet coated with radiative heat absorbing material and in which the holes or apertures 34 are pre-formed thereby permitting optimization of the air flow configuration desired for a particular application. The perforated bridge portions 35 of the sheet and the unperforated bridge portions 40 form the mid-portion of an individual louver segment 38 and the direction of air flow through the apertures 35 is indicated in FIG. 2. A segment is defined by each "S" portion of the continuous sheet 22, all as shown in FIG. 2. Obviously, the solar collector assembly described above is disposed in a direction facing the source of solar radiation in such a way as to impinge the solar radiation on the collector plate at the desired heat producing angle. The edges of holes or apertures 34 are indicated at 36 in FIGS. 2 and 3 and perforated bridge portions 35 are also indicated in FIG. 3.

The vent region of the absorber surface is of small dimension thereby promoting a higher heat transfer coefficient and the vents are distributed such that boundary layer growth is periodically removed, which has the effect of keeping boundary layers thin and thereby keeping the heat transfer coefficient high. Heated air is thus pulled away from the upper cover plate thereby reducing losses through the cover plates.

It will be obvious to one skilled in the art that the proposed collector design can be altered by modifying the geometry of the louvers as to spacing and surface configuration, as well as changing the length or number of louvers. Further modification may be achieved by turning the absorber over so that the perforated side is facing toward the source of solar radiation, thereby air can enter the space between the lowest cover plate and the absorber from a direction such that the air first passes through the perforations before flowing through the passageway between louvers.

The perforations are shown as rectangular perforations. Other shapes, such as square, circular, or oval may also be utilized in order to achieve desired air flow characteristics, reduced manufacturing cost or improved structural integrity. Also, the sheet from which the louvered absorber is made may be quilted, corrugated or otherwise formed in order to utilize lighter gage material without loss of structural stiffness and to increase thermal performance.

We claim:

1. A fluid heating solar collector comprised of:
an enclosed solar collector housing including air inlet and air outlet means and radiation receiving cover plate means; and
louver means disposed inside said collector housing, said louver means being comprised of a unitary heat conductive sheet of material having a pluality of interconnected spaced segments adjacently positioned and parallel with respect to one another, with each said segment having a plurality of aligned apertures therein, said sheet being folded along the line of said apertures in one direction and folded in the opposite direction along a line spaced from and substantially parallel to said aligned apertures to form an "S" configuration, with each extremity of the "S" being relatively substantially longer than the longer folded center portion of the "S", and with each segment including two bridge portions which are substantially parallel with respect to one another and with one of said bridge portions being perforated and the other of said bridge portions being unperforated, whereby air flow is permitted along both surfaces of said segments.

2. A fluid heating solar collection system, comprising:
an enclosed solar collector housing including fluid inlet, fluid outlet means and radiation receiving cover plate means; and
louver means disposed inside said collector housing to form a solar collector therein, with said louver means being positioned in the path of fluid flowing from said inlet means to said outlet means, said louver means being comprised of a unitary sheet of material having opposed surfaces and having a plurality of interconnected spaced segments, each segment of which has a plurality of aligned apertures therein, with said sheet being folded along said lines of said apertures in one direction and folded in the opposite direction along a second line spaced from and substantially parallel to said aligned apertures to thereby form a central portion having a substantially "S" configuration having opposite end portions extending in opposite directions from said central portion, with said opposite end portions being substantially parallel with respect to one another, whereby fluid flow is permitted along both surfaces of said sheet.

3. A fluid heating solar collection system, comprising:
an enclosed solar collector housing including fluid inlet means for receiving fluid into said housing, fluid outlet means spaced from said inlet means for discharging fluid from said housing after said fluid is passed through the interior of said housing, and radiation receiving cover plate means; and
louver means disposed in the interior of said housing to form a solar collector therein, with said louver means being positioned in the path of said fluid passing through the interior of said housing, said louver means being formed from a unitary sheet of material having opposing surfaces with said sheet being repeatedly folded so that a plurality of substantially flat first portions are positioned at each side of a plurality of second portions having a substantially "S" configuration, with each of said first portions being spaced from but substantially parallel to the others of said first portions whereby fluid flow through the interior of said housing is permitted across said opposing surfaces of at least said flat first portions of said sheets without appreciable flow disruption.

4. The system of claim 3 wherein said second portion of said louver means includes first and second bridge means formed as a part of said substantially "S" configuration with at least one of said bridge means having apertures therein for permitting fluid flow therethrough.

* * * * *